United States Patent [19]

Coles et al.

[11] Patent Number: 5,363,258
[45] Date of Patent: Nov. 8, 1994

[54] ROBOTIC MANIPULATOR WITH EJECTOR TAB

[75] Inventors: Richard D. Coles, Prinsted; David C. Teale, Winchester, both of England

[73] Assignee: International Business Machines Corporation, Armonk, N.Y.

[21] Appl. No.: 63,484

[22] Filed: May 19, 1993

[30] Foreign Application Priority Data

May 23, 1992 [GB] United Kingdom ............... 9211045

[51] Int. Cl.⁵ .................................... G11B 15/68
[52] U.S. Cl. ........................... 360/92; 369/36; 414/280
[58] Field of Search ............. 360/92; 369/36; 414/280; 901/39; 294/50

[56] References Cited

U.S. PATENT DOCUMENTS

| | | | |
|---|---|---|---|
| 4,932,826 | 6/1990 | Moy et al. | 360/92 |
| 4,945,430 | 7/1990 | Konishi et al. | 360/92 |
| 5,015,139 | 5/1991 | Baur | 414/281 |
| 5,019,927 | 5/1991 | Simone | 360/92 |
| 5,144,506 | 9/1992 | Sahota | 360/92 |

FOREIGN PATENT DOCUMENTS 0443295  8/1991  European Pat. Off. .
2918236  5/1979  Germany .

OTHER PUBLICATIONS

IBM TDB, vol. 34, No. 9, Feb., 1992 "Gripping And Moving A Cassette Without A Gripper", pp. 447–448.

*Primary Examiner*—Stuart S. Levy
*Assistant Examiner*—William R. Korzuch
*Attorney, Agent, or Firm*—F. E. Anderson; M. W. Schecter

[57] ABSTRACT

A robotic manipulator for picking and placing data storage cassettes in an automated storage library. The manipulator has a pair of fingers, one finger being longer than the other. An eject bar is located between the fingers and has a tab for pushing a storage cassette into the seated operative position in an IBM 3480 type tape reader. The manipulator approaches the slot in the reader, supporting the data cassette on the long finger and holding it in place with the short finger. The short finger pivots to free the cassette and the eject bar pushes it into the reader. When the eject bar is clear of the long finger it pivots downwards so that the tab engages the top of the cassette and pushes it into the seated position in the reader.

14 Claims, 2 Drawing Sheets

ROBOTIC MANIPULATOR WITH EJECTOR TAB

BACKGROUND OF THE INVENTION

1. Field of the Invention

The present invention relates generally to robotic manipulators for picking and placing objects. More particularly, the present invention relates to robotic manipulators for picking and placing data storage media in an automated storage library.

2. Discussion of the Related Art

An automated storage library is a memory subsystem of a larger data processing system. When data is required by the data processing system, a robot in the library is instructed to retrieve a data storage medium from a storage cell and load it into a read/write transfer device so that it may then be accessed by the data processing system.

Known robots retrieve data storage media, which are usually enclosed within a cartridge, by means of a two-fingered gripper arrangement. It is necessary that such robots retrieve and load data cartridges accurately and speedily since any errors or delays may lead to unwanted delays in the associated data processing system. Delays may be caused by the time taken to align the grippers with a data cartridge or by a data cartridge becoming stuck between the grippers when it is being placed in a read/write device or placed back in a storage cell.

The gripper arrangement disclosed in U.S. Pat. No. 5,015,139 includes a U-shaped ejector disposed between the gripper fingers. The ejector springs forward when a data cartridge is released from the grippers pushing the cartridge out from between the gripper fingers to prevent the cartridge from becoming stuck on the grippers.

In many data transfer devices, an example being the IBM 3480 Magnetic Tape Subsystem produced by International Business Machines Corporation, the data cartridge is inserted in a horizontal input slot and must then be pushed down into the operative position. The pushing down of the data cartridge is an additional step which must be performed by the robot in an automated storage library. In the system of U.S. Pat. No. 5,015,139 this additional step is performed by a push rod. However, there is an undesirable time delay caused by aligning this push rod in position with regard to the data cartridge and then pushing the cartridge downwards.

SUMMARY OF THE INVENTION

Viewed from one aspect the present invention provides a robotic manipulator for transporting a data storage medium in an automated storage library comprising: a pair of fingers for gripping a data storage medium; an ejector movable in a first direction for pushing a data storage medium positioned between the fingers away from the robotic manipulator into a data transfer device in the automated storage library; characterised in that the manipulator further comprises one or more tabs extending from the ejector for engaging a data storage medium; and means for moving the ejector in a second direction for pushing a data storage medium into a seated operative position within a data transfer device.

One advantage of this arrangement is that a data cartridge may be pushed into its seated operative position without the need for any time to be spent on further alignment of a separate push rod. This helps to reduce the time between a request for data from the data processing system to that data being available to the data processing system. In addition, a single mechanism is able to perform both the ejection and seating thereby increasing reliability and reducing cost.

Preferably the ejector is disposed between said fingers with one tab adjacent to either side of and substantially level with one of said fingers. An advantage of this arrangement is that the ejector can operate independently from the fingers without interfering with the grippers.

Preferably one of said fingers is longer than the other finger. Although both fingers may be the same length it is advantageous for them to be different since the longer finger may also be used to assist in picking up a data cartridge from a data transfer device. The longer finger engages the bottom of the data cartridge and aligns it into a position so that it may be picked up by the robot.

BRIEF DESCRIPTION OF THE DRAWING

In order that the invention will be fully understood a preferred embodiment thereof will now be described, by way of example only, with reference to the accompanying drawings in which.

DETAILED DESCRIPTION OF THE PREFERRED EMBODIMENT

Figure 1:
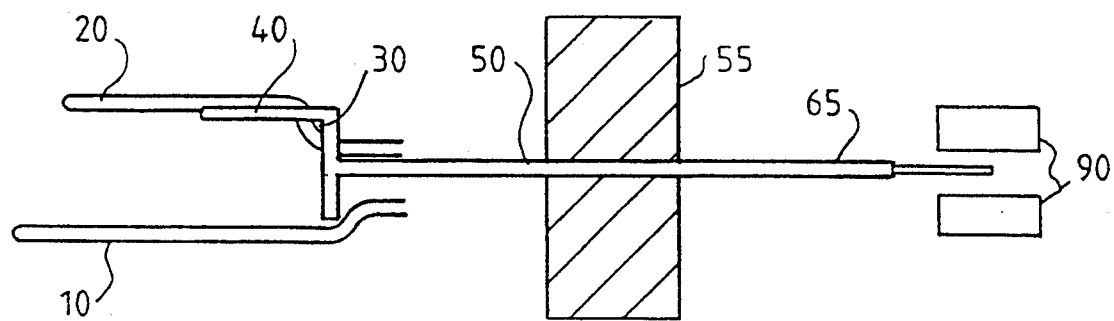
FIG. 1 is a side view of a gripper showing the fingers and ejector.
Figure 2:
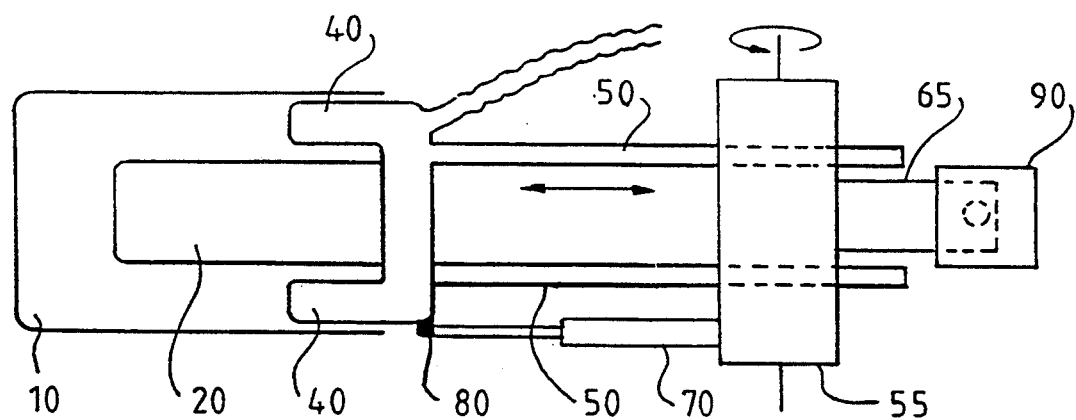
FIG. 2 is a top plan view of the gripper shown in FIG. 1.

In the gripper, which is preferably pneumatic, shown in FIG. 1 one finger 10 is longer than the other finger 20. The mechanism for moving the fingers has not been shown. The data cartridges used in the automated storage library are of the type having a chamfer along one edge. This means that the longer finger may be used to engage the cartridge chamfer and square the cartridge upright in its storage cell prior to the smaller finger touching the other side of the cartridge. This enables tighter packing of cartridges in the storage cells or shelves and therefore a larger volume of cartridges to be stored in the same area.

The gripper is mounted on a rodless cylinder carriage such as the one supplied by SMC Pneumatics (UK) Ltd (Catalogue No CDYISIOH-170 VP). The rodless cylinder end caps 80 are screwed together with a sheet of metal between them. The metal serves as a precaution to protect data cartridges from the field of the rodless cylinder main magnetic piston 70.

The rodless cylinder carriage movement uses a magnet to connect it to the main cylinder rod and the magnetic flux is preferably set at a 2 Kg breaking force. This jointing method is used to protect the gripper assembly and carriage from damage should it be extended in error and collide with any solid object. Sensors (not shown) mounted at either end of the rodless cylinder enable the control system to detect if this error condition is encountered.

Mounted on either side of the gripper is a double acting pneumatic eject cylinder connected to a bar 30. On top of this bar are two tabs 40. The bar is guided by two ground rods 50 fitted in solid bearings 55. Mounted at the back of the ejector assembly are two single acting square flip cylinders 90 controlled by a single acting solenoid. The solenoid treats both cylinders as a single, double acting cylinder. A plate 65 fixed at one end to the solid bearing 55 extends to a position between the flip cylinders 90. These cylinders are used to angle the complete eject assembly. Energization of the solenoid causes the flip cylinders to exert a force on the plate 65 which pivots the solid bearing 55 and moves the ejector bar 30 in the second direction.

The eject assembly can move in and out in any gripper position and up and down when the gripper is open and the eject assembly is extended. The eject bar is used during a placement operation to push a data cartridge out of the gripper and into a data transfer device or into a storage cell. The two tabs mounted on the eject bar are used in conjunction with the flip cylinders to angle a data cartridge and push it into the seated operative position in the data transfer device.

Figure 3:
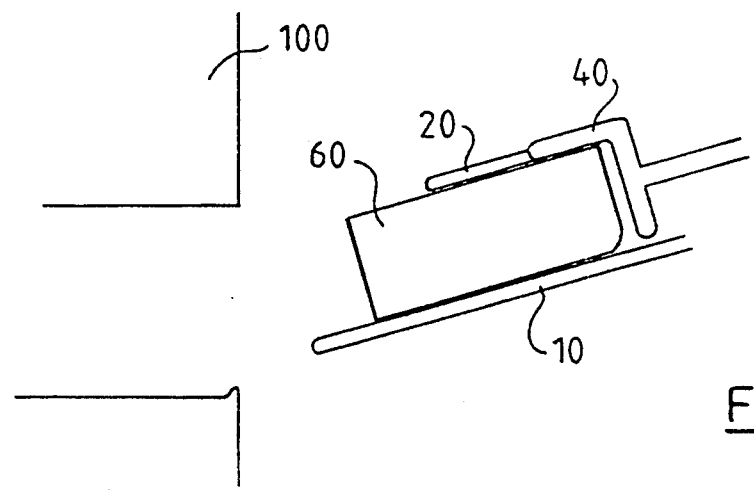
FIGS. 3–5 show the gripper inserting a data cartridge.
Figure 4:
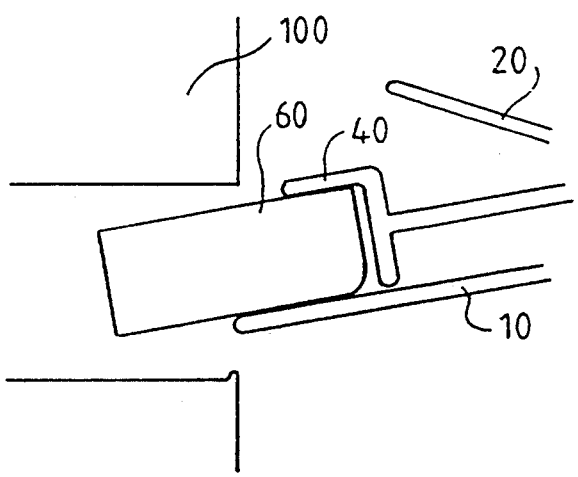
Figure 5:
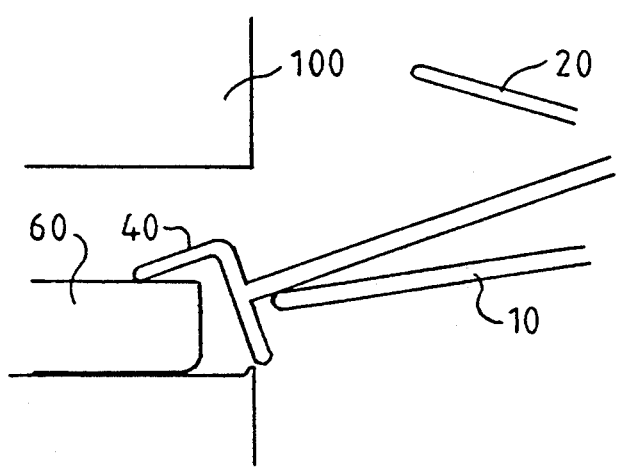

The operation of the gripper will now be described in more detail with respect to FIGS. 3-5. Only the gripper fingers and the eject bar have been shown for simplicity. In FIG. 3 the gripper has advanced towards the data transfer device 100 holding a data cartridge 60 between the fingers. In FIG. 4 the shorter finger 20 has pivoted to release the data cartridge and the ejector 30 has advanced to push the data cartridge away from between the fingers and into the data transfer device. In FIG. 5 the data cartridge has been pushed into the data transfer device and the ejector 30 has pivoted downwards so that the tabs 40 push the data cartridge into its seated operative position in the data transfer device.

While the invention has been particularly shown and described with reference to preferred embodiments thereof, it will be understood by those skilled in the art that various changes in form and details may be made therein without departing from the spirit and scope of the invention:

What is claimed is:

1. A robotic manipulator for transporting a data storage medium in an automated storage library comprising:
   a pair of fingers for gripping the data storage medium;
   an ejector having a bar at a proximate end movable in a first direction for pushing the data storage medium positioned between said fingers away from the robotic manipulator and into a first position in a data transfer device in the automated storage library;
   at least one tab extending outward from the bar of the ejector for engaging the data storage medium; and
   means for moving the ejector in a second direction for substantially causing the at least one tab to push the data storage medium downward into a second seated operative position of the data transfer device.

2. A robotic manipulator as in claim 1 wherein the ejector is disposed between the fingers with the at least one tab adjacent to either side of and substantially level with one of the fingers.

3. A robotic manipulator as in claim 1 wherein the ejector movement in the second direction is effected by a pivoting of the ejector.

4. A robotic manipulator as in claim 3 wherein one of the fingers is longer than the other finger.

5. A robotic manipulator as in claim 1 wherein the ejector movement in the first direction is effected pneumatically.

6. A robotic manipulator as in claim 5 wherein one of the fingers is longer than the other finger.

7. An automated storage library comprising:
   means for storing a plurality of data storage media;
   a data transfer device; and
   a robotic manipulator comprising:
   a pair of fingers for gripping one of the data storage media;
   an ejector extendable in a first direction for pushing the data storage medium positioned between the fingers away from the robotic manipulator into a first position in the data transfer device;
   at least one or more tabs extending from the ejector for engaging the data storage medium; and
   means for moving the ejector in a second direction, after extending the ejector in the first direction, for pushing the data storage medium downward into a second seated operative position in the data transfer device.

8. An automated storage library as in claim 7 wherein the ejector, in an unextended position, is disposed between the fingers with one tab adjacent to either side of and substantially level with one of the fingers.

9. An automated storage library as in claim 8 wherein movement in the second direction is effected by a pivoting of the ejector.

10. An automated storage library as in claim 9 wherein one of the fingers is longer than the other finger.

11. An automated storage library as in claim 7 wherein movement in the second direction is effected by a pivoting of the ejector.

12. An automated storage library as in claim 11 wherein one of the fingers is longer than the other finger.

13. An automated storage library comprising:
    means for storing a plurality of data storage media;
    a plurality of data transfer devices; and
    a robotic manipulator comprising:
    a pair of fingers for gripping one of the data storage media, one of the fingers longer than the other finger;
    an ejector disposed between the fingers and extendable in a first direction for pushing the data storage medium positioned between the fingers away from the robotic manipulator into a first position in one of the plurality of data transfer devices;
    at least one tab extending from the ejector for engaging the data storage medium, one tab located across form one finger and adjacent to either side of and substantially level with the other finger; and
    means effected by a pivoting of the ejector for moving the ejector in a second direction while the at least one tab is extended substantially beyond one of the fingers for pushing the data storage medium downward into a second seat operative position in the data transfer device.

14. A method for inserting data storage medium in a data transfer device included in an automated storage library comprising the steps of:
    extending an ejector in a first direction so that a bar located at an end of the ejector pushes the data storage medium into a first position in the data transfer device from a robotic gripper in the automated storage library; and
    moving the extended ejector in a second direction, downward from the first direction, so that a tab extending from the bar pushes the data storage medium into a second seated operative position in the data transfer device.

* * * * *